2 Sheets—Sheet 1.

G. F. WILSON.
Apparatus for Drying.

No. 215,192. Patented May 6, 1879.

WITNESSES.

INVENTOR.

2 Sheets—Sheet 2.

G. F. WILSON.
Apparatus for Drying.

No. 215,192. Patented May 6, 1879.

WITNESSES.            INVENTOR.

N. PETERS, PHOTO-LITHOGRAPHER, WASHINGTON, D C.

UNITED STATES PATENT OFFICE.

GEORGE F. WILSON, OF EAST PROVIDENCE, RHODE ISLAND.

IMPROVEMENT IN APPARATUS FOR DRYING.

Specification forming part of Letters Patent No. 215,192, dated May 6, 1879; application filed February 21, 1879.

*To all whom it may concern:*

Be it known that I, GEORGE F. WILSON, of East Providence, in the county of Providence and State of Rhode Island, have invented a new and useful Improvement in Apparatus for Drying or Roasting Substances, which improvement is fully set forth in the following specification.

This invention relates to an apparatus for drying or roasting substances by a continuous process, in which the temperature may be readily regulated, evenly applied, and the substance or material treated prevented from caking or becoming burnt or scorched in spots.

Apparatus of various kinds have heretofore been devised for the drying and roasting of different substances. In the drying of lumber, for example, it has been placed in an oven heated by flues in the walls, and for some other substances screws-conveyers, turning in casings heated externally by steam-jacket or by the direct action of flames and products of combustion, have been employed; but with such apparatus it is impossible to evenly and continuously subject the material to the action of a temperature of the proper degree and character required for many purposes.

In this invention the material is conveyed from end to end of a stationary cylindrical casing by means of a screw in the inside, the thread of which is provided with projections, which serve to break up and prevent caking of material treated, the casing itself being not exposed to the direct action of the fire or products of combustion, but placed in an oven heated by flues in which the products of combustion pass.

The following description will enable those skilled in the art to which it appertains to make and use my invention, reference being had to the accompanying drawings, forming part of this specification.

Figure 1:
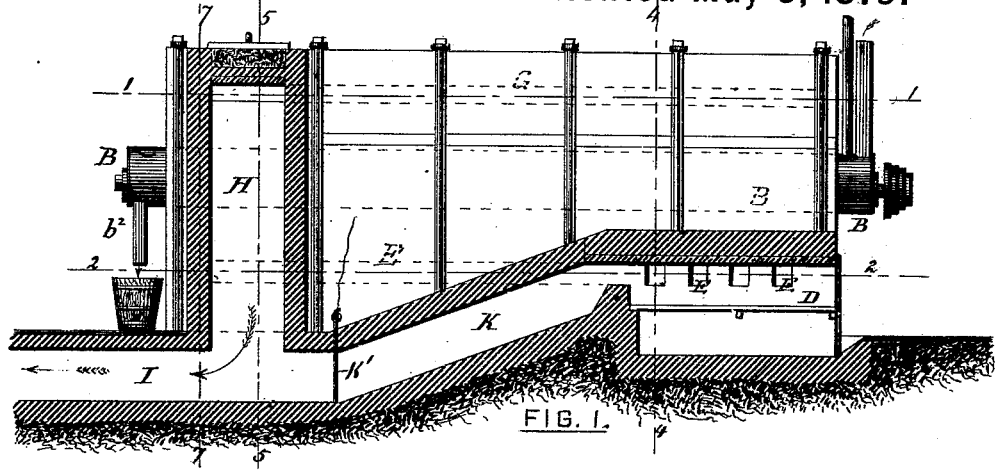
Figure 2:
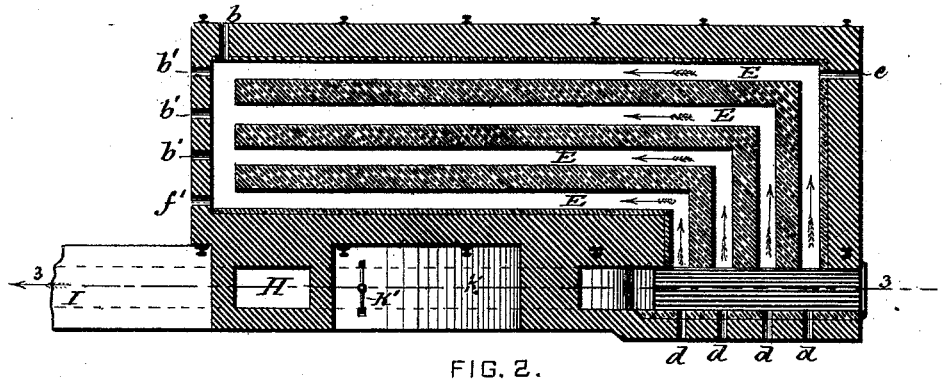
Figure 3:
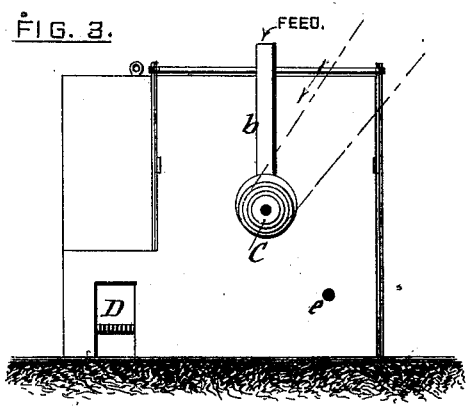
Figure 4:
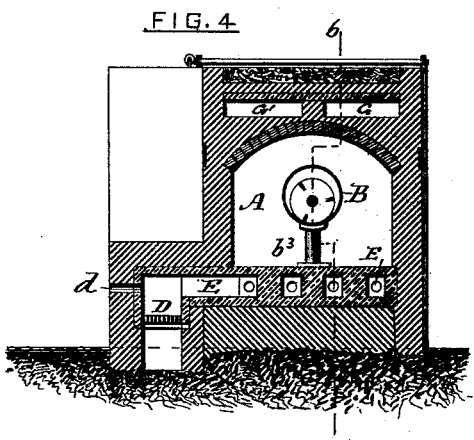
Figure 5:
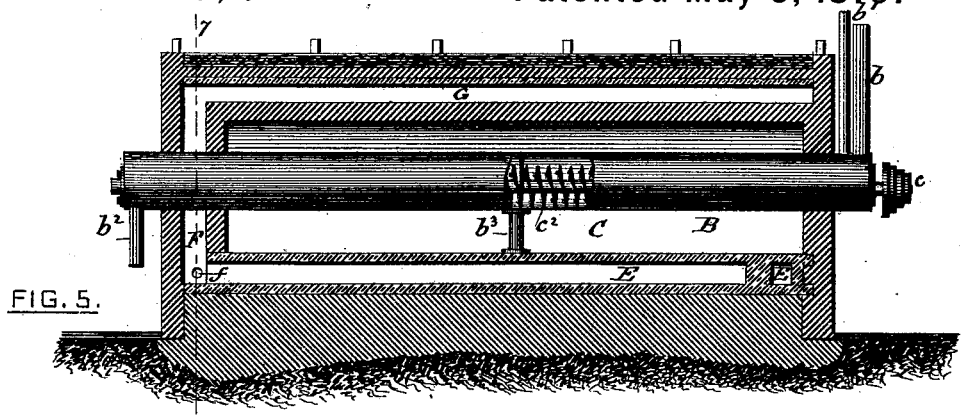
Figure 6:
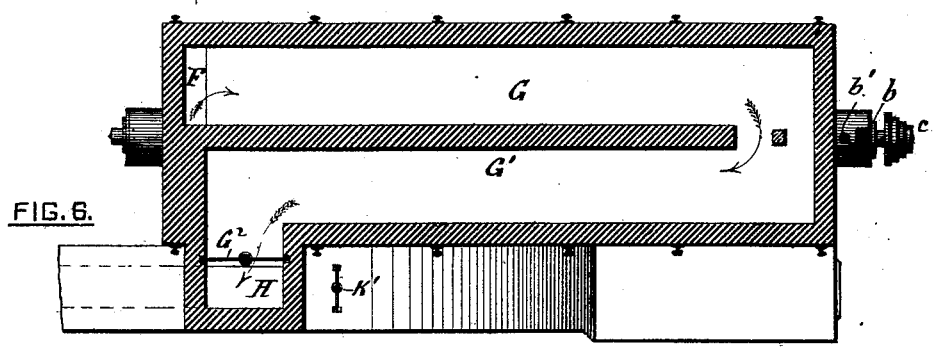
Figure 9:
Figures 7, 8:
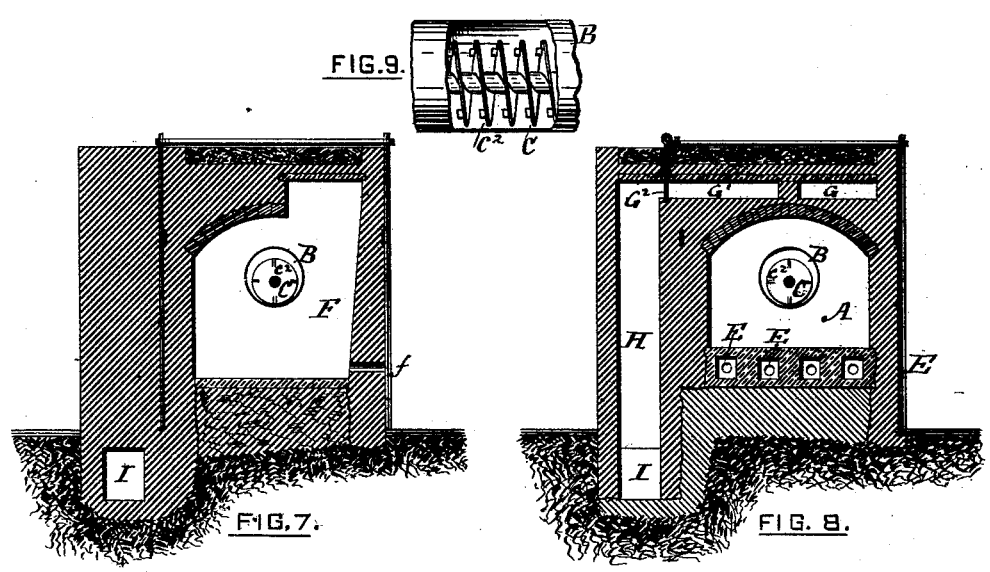

Figure 1 is a side view, partly in section on line 3 3, Fig. 2; Fig. 2, a section on line 2 2, Fig. 1; Fig. 3, an end view; Fig. 4, a view, in section, on line 4 4, Fig. 1; Fig. 5, a view, in section, on line 6 6, Fig. 4, with part of the wall of the casing cut away to show the screw or conveyer inside; Fig. 6, a section on line 1 1, Fig. 1; Fig. 7, a section on line 7 7, Figs. 1 and 5; and Fig. 8, a section on line 5 5. Fig. 9 is an enlarged view of a section of the screw-conveyer as represented in Fig. 5.

The outer or main walls are constructed of brick or other suitable material, held together with tie-rods, as represented, or any other ordinary or suitable mode of building may be adopted. The oven, fire-place, and flues may be lined or made of fire-brick, or of any suitable material. The casing and conveyer are ordinarily made of metal.

A represents the oven, in which the casing B is placed, the screw-conveyer C turning therein.

D is the fire-place, from which the products of combustion pass through the horizontal flues E beneath the oven, which open into a vertical flue, F. The latter is connected with the horizontal flues G G$^1$ on the top of the oven, and the flue G$^1$ is connected by the vertical flue H with the outlet I. A valve, G$^2$, is placed in the flue G$^1$, to close, when desired, the opening between it and the flue H. The fire-place is also connected directly with this outlet by the flue K, which has a valve or gate, K$'$, so that communication therethrough may be closed, as desired.

At suitable points in the fire-place above the grate, and in the flues, are placed holes $d$ $e$ $f$ $f'$, for the admission of air to burn all combustible gases arising from the fuel on the grate.

The ends of the conveyer-casing B extend beyond the walls of the apparatus, and one of these is provided with a feed hopper or passage, $b$, for introducing the material treated, and also with a pipe or tube, $b^1$, for the withdrawal of air from the casing, to remove moisture, and to preserve the proper temperature therein.

A supporting-post, $b^3$, may, if desired, be placed under the middle of the casing B. The other extremity is provided with an exit-passage or spout, $b^2$, through which air may be drawn into the casing. The ends of the casing are closed, and contain bearings for the shaft of the conveyer C, which is revolved by means of a belt on a pulley, $c$. The thread of the conveyer is provided on the side which advances the material within the casing with projections $c^2$, which lift and turn over said material, thereby preventing its caking, and insuring that all parts are evenly acted upon by the heat.

The operation of the apparatus is as follows: Fire being kindled in the fire-place, the products of combustion are allowed to pass directly into the outlet I through the flue K, the valve K' being opened. When the fire is properly burning and the draft established this valve is closed, the valve $G^2$ being open. The products of combustion pass, as indicated by the arrows, from the fire-place, through the flues E beneath the oven, into the vertical flue F, then into the flue G over the top of the oven, and back through the flue G', also above the oven, into the vertical flue H, from which they pass into the outlet I. Air is drawn through the air-holes in the walls to burn all combustible gases.

If it is desired that not all the hot gases of combustion pass through the flues above and below the oven, a portion may be allowed to pass through the flue K directly into the outlet, the percentage being regulated by the valves $G^2$ K'.

The conveyer being put in motion by means of a belt, as indicated by the arrow in Fig. 3, the material to be treated is introduced by the hopper or passage $b$, as indicated by the word "feed" and the arrow in Fig. 3.

The conveyer C, as it revolves, carries the material gradually through the casing B, at the same time agitating it by means of the projections $c^2$. The moisture is carried off through the pipe $b^1$. The dried and roasted material is delivered from the casing by the spout $b^2$ into a suitable receptacle.

Modifications may be made in the details of construction without departing from the spirit of my invention.

I do not intend to limit myself to the materials of which my apparatus is constructed, as any suitable materials may be used, although I regard the described construction as the best.

The apparatus may be used for drying and roasting various materials, and among them starch for manufacturing British gum or gum substitute.

Having thus described my invention and the manner in which the same is or may be carried into effect, what I claim, and desire to secure by Letters Patent, is—

1. The herein-described apparatus, composed of a conveyer-screw and stationary casing located in an oven heated by flues in the walls thereof, substantially as set forth.

2. An apparatus composed of an oven, a conveyer-screw, and an inclosing-casing located in said oven at a suitable distance from the surrounding walls, the top and bottom of the oven being provided with heating-flues, substantially as set forth.

3. The combination, with the stationary casing, of the interior conveying-screw, formed of a continuous spiral blade provided with rigid projections on the face, substantially as specified.

4. The combination of the oven, heated by flues, with a stationary casing located therein at a suitable distance from the walls, a conveyer provided with projections on the face, and means for operating said conveyer within the casing, substantially as described.

5. An apparatus for drying or drying and roasting substances, composed of the following elements: first, an oven; second, a screw-conveyer, and, third, its inclosing-casing located in said oven; fourth, a fire-place arranged at the side of said oven; fifth, flues leading from the fire-place under the oven to, sixth, an upright flue at the end opposite to that at which the fire-place is located; seventh, a horizontal flue or flues above the oven; eighth, an outlet connected with the last-named horizontal flue and with the fire-place directly; and, ninth, valves for regulating the passage of the gases of combustion from the fire-place into said outlet, either directly or through the aforesaid flues, substantially as described.

In testimony whereof I have signed this specification in the presence of two subscribing witnesses.

GEO. F. WILSON.

Witnesses:
E. A. DICK,
C. J. HEDRICK.